(12) United States Patent
Lipman et al.

(10) Patent No.: US 9,756,333 B2
(45) Date of Patent: Sep. 5, 2017

(54) ENHANCED WIRELESS DISPLAY (75) Inventors: Justin Lipman, Shanghai (CN);
Zhaohua L. Yi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 13/977,574

(22) PCT Filed: Dec. 20, 2011

(86) PCT No.: PCT/US2011/065993
§ 371 (c)(1),
(2), (4) Date: Apr. 24, 2014

(87) PCT Pub. No.: WO2013/095354
PCT Pub. Date: Jun. 27, 2013

(65) Prior Publication Data
US 2014/0233629 A1 Aug. 21, 2014

(51) Int. Cl.
*H04N 7/26* (2006.01)
*H03M 13/09* (2006.01)
*H04B 1/66* (2006.01)
*H03M 13/05* (2006.01)
*G06F 17/00* (2006.01)
(Continued)

(52) U.S. Cl.
CPC ..... *H04N 19/00915* (2013.01); *G06F 3/1438* (2013.01); *G06F 3/1454* (2013.01); *G09G 5/14* (2013.01); *H04N 19/436* (2014.11); *H04N 19/507* (2014.11); *G09G 2340/02* (2013.01); *G09G 2354/00* (2013.01); *G09G 2360/02* (2013.01); *G09G 2370/10* (2013.01); *G09G 2370/16* (2013.01); *H04N 21/43637* (2013.01)

(58) Field of Classification Search
CPC ........ H03M 13/09; H03M 13/05; H04B 1/66; G06F 17/00; G06F 15/16
See application file for complete search history.

(56) References Cited

U.S. PATENT DOCUMENTS 6,621,500 B1 * 9/2003 Alcorn ...................... G06F 3/14
345/589
2006/0235883 A1 10/2006 Krebs
(Continued)

FOREIGN PATENT DOCUMENTS

CN 1402852 A 3/2003
CN 101201720 A 6/2008
(Continued)

OTHER PUBLICATIONS

Office Action received for Korean Patent Application No. 10-2014-7017900, mailed on Jun. 21, 2015, 5 pages of English Translation and 7 pages of Korean Office Action.
(Continued)

*Primary Examiner* — Sath V Perungavoor
*Assistant Examiner* — Patricia I Young
(74) *Attorney, Agent, or Firm* — Schiff Hardin LLP (57) ABSTRACT

A device source provides an ability to decompose a graphical display into multiple data streams (i.e., different layers). The multiple data streams may include multimedia data streams, operating system (OS) desktop data streams, and mouse data streams. The multiple data streams may be encoded and transmitted independently by the device source to a wireless display device.

26 Claims, 6 Drawing Sheets

(51) Int. Cl.
   *G09G 5/00* (2006.01)
   *H04N 19/86* (2014.01)
   *G06F 3/14* (2006.01)
   *G09G 5/14* (2006.01)
   *H04N 19/436* (2014.01)
   *H04N 19/507* (2014.01)
   *H04N 21/4363* (2011.01)

(56) References Cited

U.S. PATENT DOCUMENTS

| | | | |
|---|---|---|---|
| 2007/0005795 A1 | 1/2007 | Gonzalez | |
| 2008/0285643 A1* | 11/2008 | Diab | H04L 12/2805 375/240.01 |
| 2009/0252217 A1 | 10/2009 | Wittig | |
| 2010/0146363 A1 | 6/2010 | Birru et al. | |
| 2011/0010607 A1 | 1/2011 | Raveendran | |
| 2013/0148740 A1* | 6/2013 | Samanta Singhar | H04N 19/507 375/240.24 |

FOREIGN PATENT DOCUMENTS

| | | |
|---|---|---|
| CN | 101350923 A | 1/2009 |
| EP | 1228453 A1 | 8/2002 |
| JP | 2003-513538 A | 4/2003 |
| JP | 2007-311957 A | 11/2007 |
| JP | 2009-224847 A | 10/2009 |
| JP | 2009-246415 A | 10/2009 |
| JP | 2010-237726 A | 10/2010 |
| JP | 2011-040808 A | 2/2011 |
| KR | 10-2002-0058068 A | 7/2002 |
| WO | 01/31497 A1 | 5/2001 |
| WO | 2009/102010 A1 | 8/2009 |
| WO | 2013/086530 A2 | 6/2013 |
| WO | 2013/095354 A1 | 6/2013 |

OTHER PUBLICATIONS

Office Action received for Japanese Patent Application No. 2014-548742, mailed on May 26, 2015, 2 pages of English Translation and 1 pages of Japanese Office Action.

International Search Report and Written Opinion Received for PCT Patent Application No. PCT/US2011/065993, mailed on Sep. 7, 2012, 9 pages.

International Preliminary Report on Patentability and Written Opinion received for PCT Patent Application No. PCT/US2011/65993, mailed on Jul. 3, 2014, 6 pages.

Notice of Allowance received for Korean Patent Application No. 10-2014-7017900, mailed on Dec. 21, 2015, 2 Pages of Notice of Allowance only.

Office Action received for Chinese Patent Application No. 201180075614.0, mailed on Nov. 2, 2016, 10 Pages of Chinese Office Action Only.

Office Action dated Jun. 20, 2017 for Chinese Patent Application No. 201180075614.0 (with English translation).

* cited by examiner

ENHANCED WIRELESS DISPLAY

BACKGROUND

Wireless display (WiDi) technology is an example of a video technology that enables content sharing from a device such as, a personal computer (PC), to another device (e.g., wireless display unit). Content from the device may be transmitted over a wireless channel to the wireless display unit such as, a television (TV), another PC display/screen, or other WiDi enabled device. In an implementation, an entire desktop from the device is captured and continuously transferred to the wireless display unit. In a system that provides continuous frame buffer to the display unit, redundancy in data transmission may occur when the entire desktop is static. In other words, continuous encoding stream may introduce high network utilization even when the entire desktop is not changing.

During transmission, stream based lossy encoding mechanism may introduce noise artifacts that are visible to a user and may provide poor user experience when displaying operating system (OS) desktop graphics. To this end, WiDi's capability to remotely display the operating system (OS) desktop graphics in order to provide better visual and interaction experience for the user may be further enhanced. The enhancement may reduce network overhead and optimizes network conditions.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

A software based implementation in a device source, provides an ability to decompose a graphical display into multiple data streams (i.e., different layers). The multiple data streams may include multimedia data streams, operating system (OS) desktop data streams, and mouse (pointing device) data streams. The multiple data streams may be encoded and transmitted independently by the device source. Similarly, a display device decodes the received multiple data streams independently. Further, updates regarding image changes (e.g., OS desktop background) may be limited to transmissions of updates based on detected modified cells. For example, a frame may be divided into k number of cells that include N×M number of pixels. In this example, the modified cell(s) may be detected by comparing the cells of two successive frames using a parallelized graphics processing unit (GPU) based algorithm. The detected modified cell(s) may be transmitted and merged to current buffer frame of the display device. Accordingly, network optimization is obtained.

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing systems registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Area Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments, 802.11ad ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with one or more types of wireless communication signals and/or systems, for example, Radio Frequency (RF), Wi-Fi, Wi-Max, Ultra-Wideband (UWB), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Example System

Figure 1:
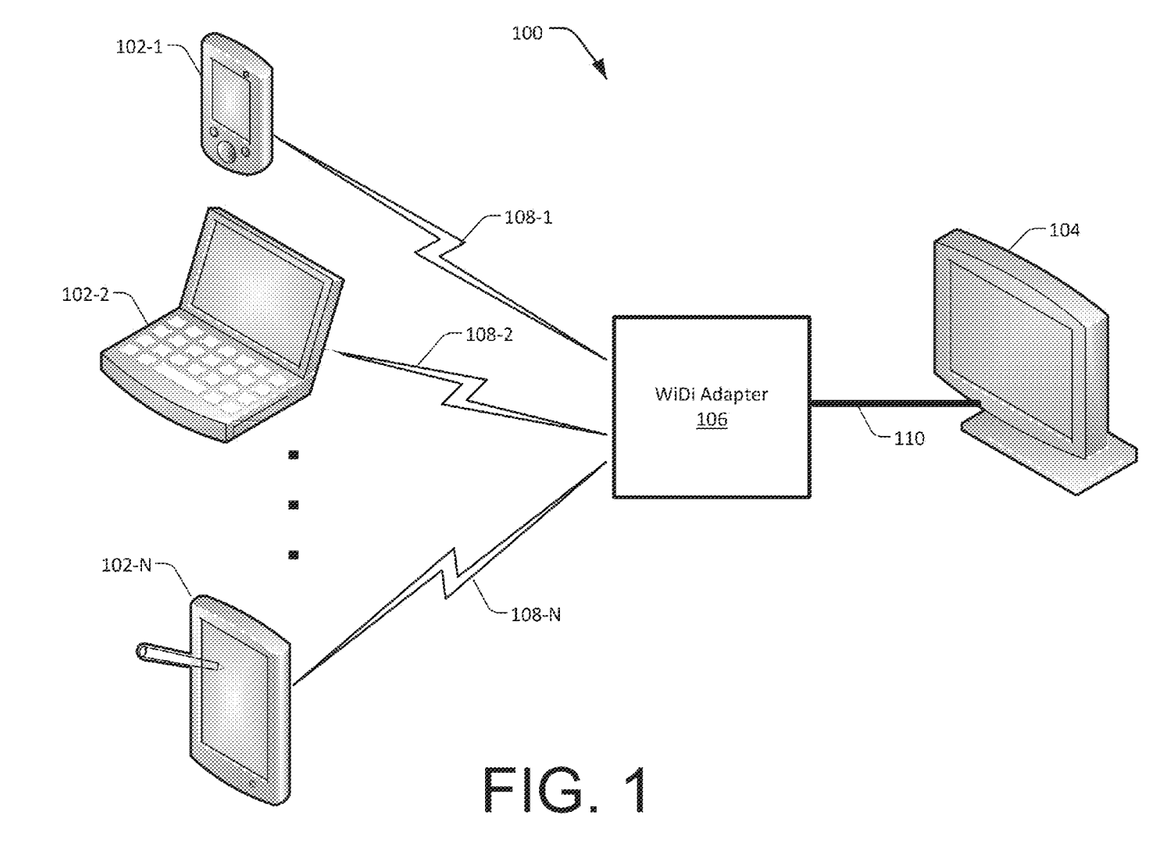
FIG. 1 is a diagram illustrating an example system implementing enhanced wireless display (WiDi) with multiple data streams encoding.

FIG. 1 shows a system-level overview of an example system environment 100 for implementing enhanced wireless display (WiDi) using multiple data streams to represent a graphical display. In an implementation, the graphical display is decomposed into different layers such as, a multimedia data streaming (e.g., video and audio), operating system (OS) desktop data streaming (e.g., desktop background), and mouse (pointing device) data streaming. The graphical display may be transmitted from device source 102 to a display device 104 using a WiDi adapter 106. In an implementation, the device source 102 may include various devices, such as laptop computers, tablet computers, smart phones, etc. Furthermore, as discussed above, the device source 102 is understood to include other devices.

Device source 102 may include a software based implementation to enhance WiDi data transmission. For example, the device source 102 may be configured to encode and transmit independently the different layers in the graphical display. In this example, the device source 102 may transmit independently the multimedia data streams, the operating system (OS) desktop data streams, and the mouse (pointing device) data streams. In an implementation, an end user may select which one or more combinations of the different layers to display at the display device 104. The WiDi adapter 106 may receive the selected layer. Further, the WiDi adopter 106 may merge updates to a current display in the display device 104. The updates may include image changes at the device source 102 that need to be transmitted at the display device 104. The WiDi adapter 106 may receive the transmitted different layers (i.e., multiple data streams) through one or more wireless channels 108. The one or more wireless channels 108 may include modulation(s) defined under one or more IEEE standards. In an implementation, the display device 104, such as a HD television (HDTV) may be connected to the WiDi adapter 106 by a connection 110, such as a high definition multimedia input (HDMI) connection. In other implementations, WiDi technology enabled devices, such as HDTV units or other display devices, may directly incorporate WiDi technology. In other words, the WiDi adapter 106 may be directly integrated to the display device 104.

Example Device

Figure 2:
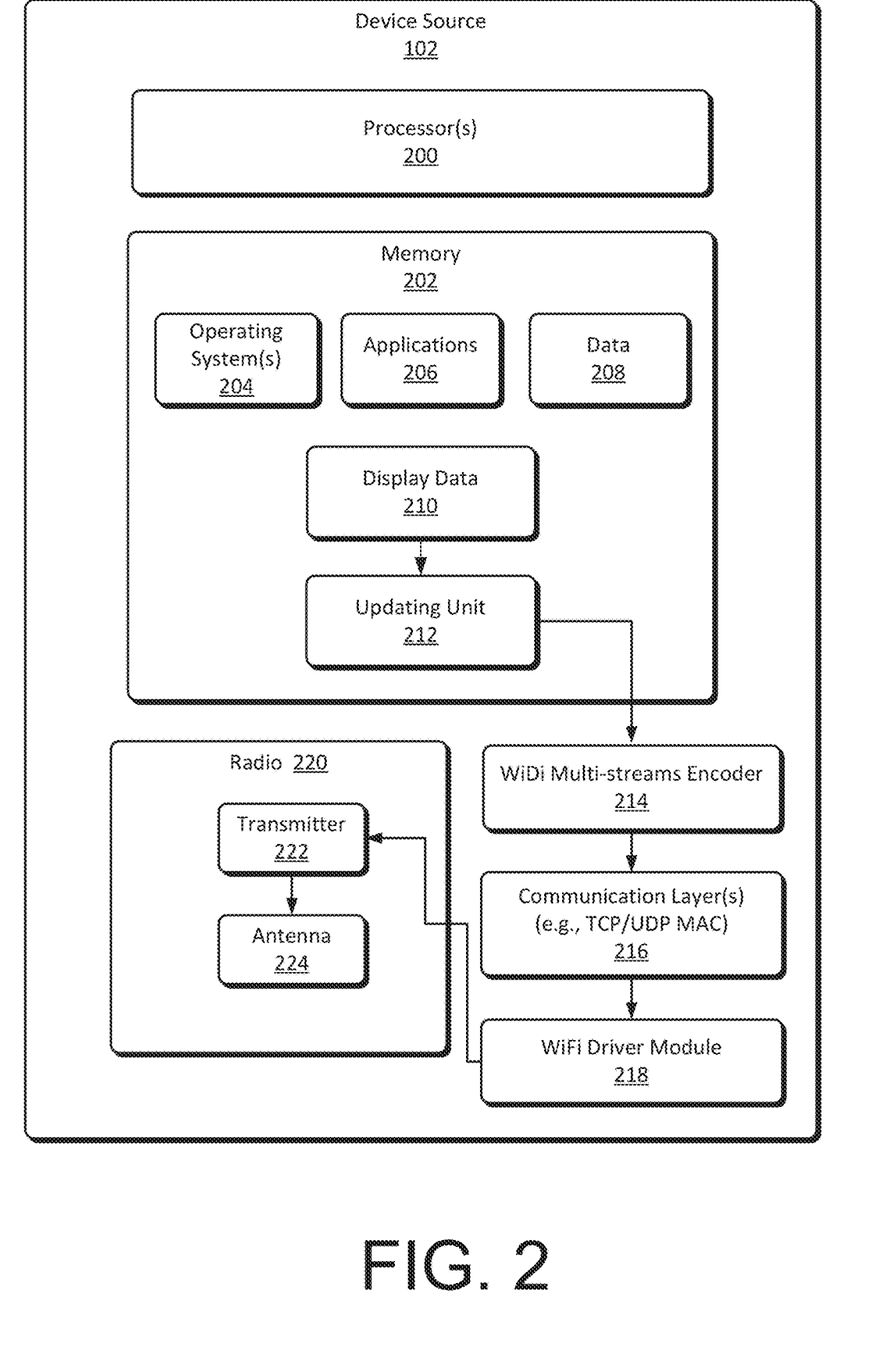
FIG. 2 is a diagram illustrating an example device source that implements enhanced wireless display (WiDi) multiple data streams encoding.

FIG. 2 is an example device source 102 that implements enhanced WiDi by encoding and transmitting independently the multiple data streams in the graphical display. Device source 102 includes one or more processors, processor(s) 200. Processor(s) 200 may be a single processing unit or a number of processing units, all of which may include single or multiple computing units or multiple cores. The processor(s) 200 may be implemented as one or more microprocessors, microcomputers, microcontrollers, digital signal processors, central processing units, state machines, logic circuitries, and/or any devices that manipulate signals based on operational instructions. Among other capabilities, the processor(s) 200 may be configured to fetch and execute computer-readable instructions or processor-accessible instructions stored in a memory 202 or other computer-readable storage media.

Memory 202 is an example of computer-readable storage media for storing instructions which are executed by the processor(s) 200 to perform the various functions described herein. For example, memory 202 may generally include both volatile memory and non-volatile memory (e.g., RAM, ROM, or the like). Memory 202 may be referred to as memory or computer-readable storage media herein. Memory 202 is capable of storing computer-readable, processor-executable program instructions as computer program code that may be executed by the processor(s) 200 as a particular machine configured for carrying out the operations and functions described in the implementations herein.

Memory 202 may include one or more operating systems 204, and may store one or more applications 206. The operating system(s) 204 may be one of various known and future operating systems implemented for personal computers, audio video devices, etc. The applications 206 may include preconfigured/installed and downloadable applications. In addition, memory 202 may include data 208 to store the installed and downloaded applications. Memory 202 includes display data 210 that may include a visual display unit to show image representations (i.e., graphical display) defined by the multiple data streams. The multiple data streams may include the different layers that may be processed independently by updating unit 212. In an implementation, the updating unit 212 may implement the parallelized GPU based algorithm to detect the modified cell(s) between successive frames. Further, the updating unit may decompose the graphical display into multiple data streams.

In an implementation, the multiple data streams may be transmitted using WiDi multi-streams encoder 214 that uses different transport techniques for the multiple data streams. For example, the multimedia data streams may use H264 standard encoder and adopts always-on streaming approach. On the other hand, the operating system (OS) desktop application and the mouse (pointing device) data streams may be transmitted on demand. In other words, the multiple data streams are treated separately such as, having different level of quality of service (QOS) to maximize overall user experience while optimizing system and network performance. In other implementations, the processing (e.g., decomposing) of the multiple data streams is independent of the operating system (OS) desktop manager at the device source 102.

In an implementation, the WiDi multi-streams encoder 214 may be configured to encode and packetize separately and independently the multiple data streams generated by the updating unit 212. The encoded and packetized multiple data streams may be sent to one or more communication layer(s) 216, where additional information may be added. The layers may include real-time communications protocol (RTC)/transmission control protocol (TCP)/user datagram protocol (UDP) and media access control (MAC) layers where additional information (e.g., headers and data) are added. A WiFi driver module 218 may receive the multiple data streams from the communication layer(s) 216. The WiFi driver module 218 may be configured to a radio 220. In particular, the WiFi driver module 218 may be configured to a transmitter 222 of the radio 220. The transmitter 222 is coupled to an antenna 224. It is to be understood that device source 102 may include other communication interfaces (not shown), other than the radio 220.

Embodiments provide for software implementations. For example, the updating unit 212 may be implemented as software applications resident in memory 202. Therefore, hardware implementation may be avoided, such as modification of the radio 220. In certain implementations, the updating unit 212 and WiDi multi-streams encoder 214 are resident on the same platform.

The device source 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example WiDi Adapter/WiDi Enabled Device

Figure 3:
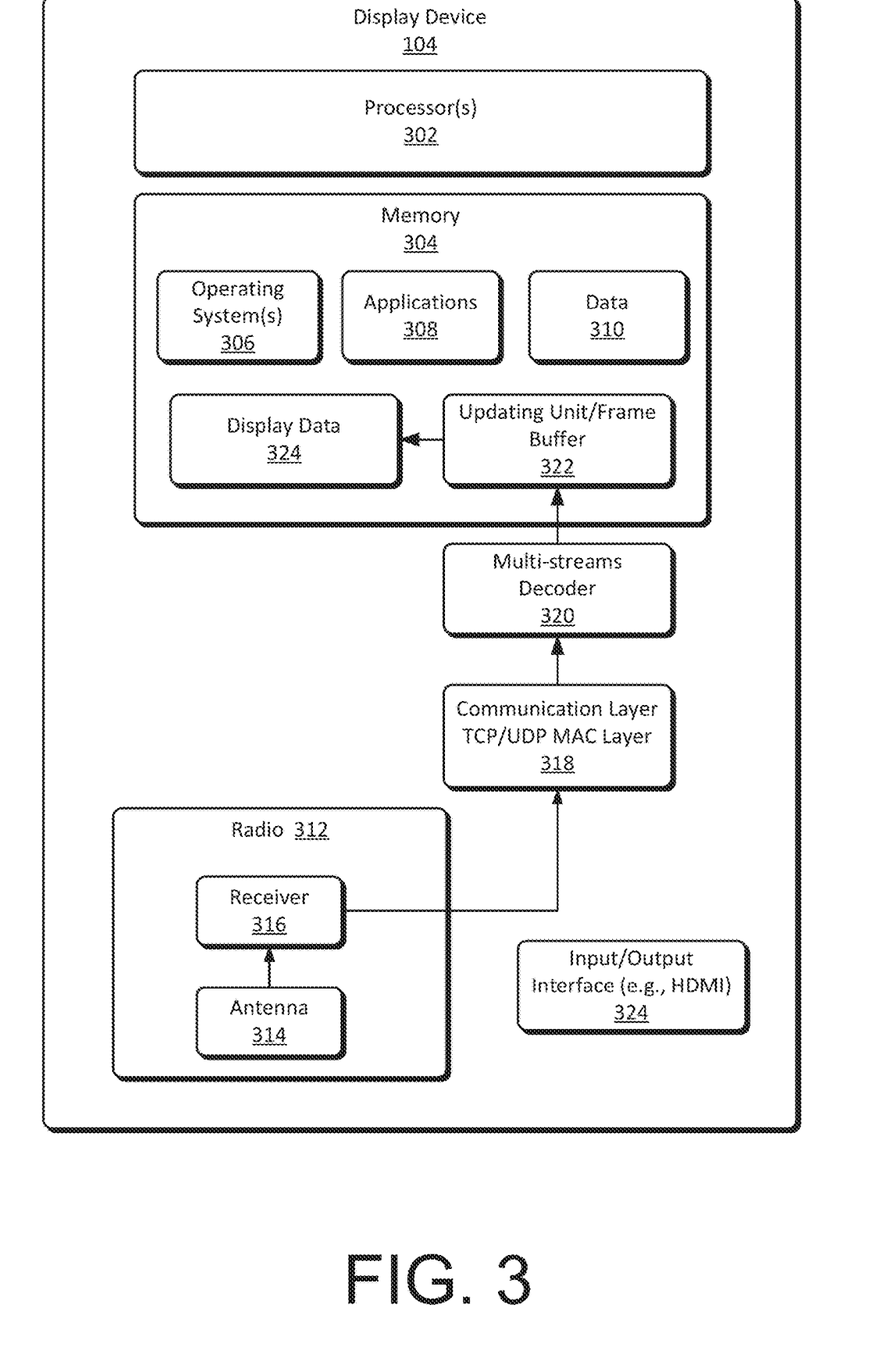
FIG. 3 is a diagram illustrating an example display device that receives multiple data streams.

FIG. 3 is an example display device 104 that receives the transmitted multiple data streams from the device source 102. In an implementation, the display device includes the WiDi adapter 106 (i.e., integrated to the display device 104). The display device 104 may include one or more processors, processor(s) 302. Processor(s) 302 may be a single processing unit or a number of processing units, all of Which may include single or multiple computing units or multiple cores. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 may be configured to fetch and execute computer-readable instructions or processor-accessible instructions stored in a memory 304 or other computer-readable storage media.

Memory 304 is an example of computer-readable storage media for storing instructions which are executed by the processor(s) 302 to perform the various functions described herein. For example, memory 304 may generally include both volatile memory and non-volatile memory (e.g., RAM, ROM, or the like). Memory 304 may be referred to as memory or computer-readable storage media herein. Memory 304 is capable of storing computer-readable, processor-executable program instructions as computer program code that may be executed by the processor(s) 302 as a particular machine configured for carrying out the operations and functions described in the implementations herein.

Memory 304 may include one or more operating systems 306, and may store one or more applications 308. The operating system(s) 306 may be one of various known and future operating systems implemented for personal computers, audio video devices, etc. The applications 308 may include preconfigured/installed and downloadable applications. In addition, memory 304 can include data 310.

Display device 104 may include a radio 312. The radio 312 includes one or more antenna 314 coupled to a receiver 316, Encoded and packetized multiple data streams sent from device source 102 are received by the receiver 316. The received multiple data streams may be passed on through various communication layers 318. A multi-streams decoder 320 processes (decodes) the multiple data streams, and passes the decoded multiple data streams to updating unit/frame buffer 322 for display at display data 324.

The example device 300 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example of Updating Unit Device

Figure 4:
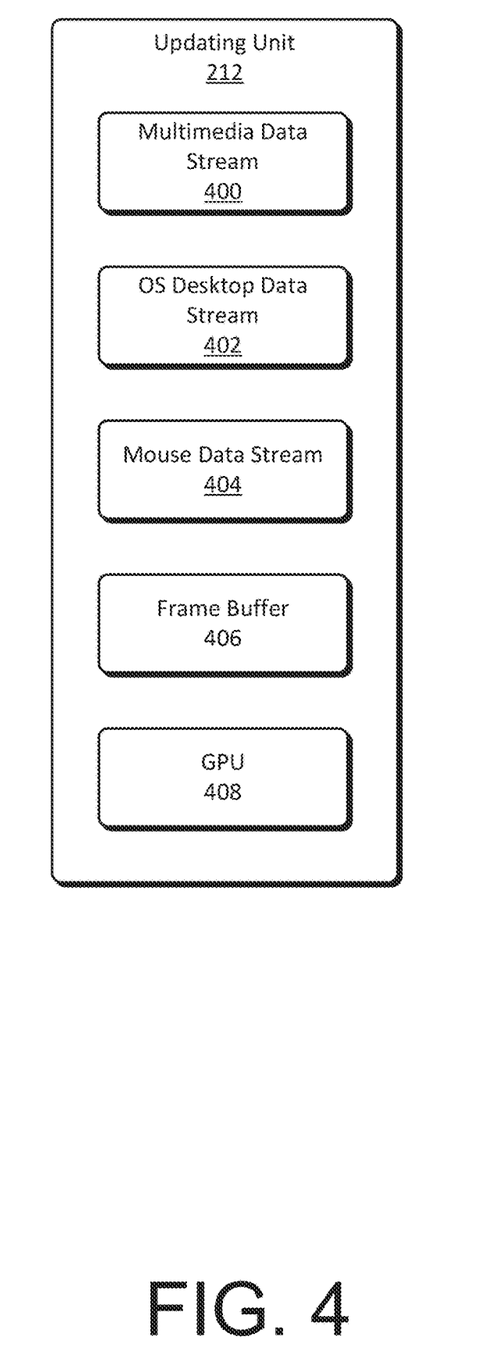
FIG. 4 is a diagram illustrating an updating unit device that implements decomposition of a graphical display into multiple data streams.

FIG. 4 shows a diagram illustrating an updating unit device. In an implementation, the updating unit 212 may be configured to decompose the graphical display at the display data 210 into different layers (i.e., multiple data streams). The multiple data streams may include multimedia data streams 400 (e.g., video and audio), operating system (OS) desktop data streams 402 (e.g., desktop background), and mouse (pointing device) data streams 404. One or more combinations of the multiple data streams may be transmitted to the display device 104. For example, a user selects the multimedia data stream 400 to display at the display device 104. In this example, transmissions of the operating system (OS) desktop data streams 402 and the mouse (pointing device) data streams 404 are suspended. The non-transmission of the operating system (OS) desktop data streams 402 and the mouse data streams 404 may optimize network load and reduces power consumption at the device source 102 and the display device 104.

At another instance, the user may choose to add the operating system (OS) desktop data stream 402 and the mouse (pointing device) data streams 404 alongside the multimedia data stream 400 at the display device 104. In this implementation, a continuous transmission of the operating system (OS) desktop data streams 402 and the mouse (pointing device) data streams 404 notwithstanding lack of image changes (e.g., static operating system (OS) desktop) at the display data 210 may introduce high network utilization. To this end, the updating unit 212 may be configured to transmit partial updates or partial changes of the image display to conserve data processing and power consumption. In an implementation, a frame that defines a particular graphical display image at the display data 210 is divided into k cells of size N×M pixels. Typically, two successive frames that are stored in a frame buffer 406 may include partial updates or changes that may not include the total area covered by the k cells. In other words, a portion of the k cells may cover the partial updates. To determine the partial updates, the k cells between the two stored successive frames (e.g., current and previous frames) may be compared by detecting a particular cell(s) that are modified. The detection of the modified cells may be implemented using the parallelized GPU based algorithm configured in a GPU 408.

In an implementation, the GPU 408 may include n number of cores (not shown) to implement the parallel comparison between successive frames. For example, given n-GPU 408 cores to compare k-cells frame, n-instances of comparison algorithm is executed until all k-cells are compared. A tracking array (not shown) may be implemented by the GPU 408 to detect the cell(s) that were modified. For example, the tracking array is updated to bit one (1) every time a modification is detected. In other implementations, the GPU 408 may be configured to exit comparison once the modification is detected.

In an implementation, the GPU 408 may be configured to process dynamic N×M pixel dimensions. The dynamic N×M pixel dimensions may be adjusted to fit into a particular single frame to enable more atomic updates and to limit effects of corrupted or lost frame. In other implementations, the GPU 408 may be configured to assign importance to updates of specific regions of the desktop operating system (OS) screen given the way in which the user may view the screen. For example, the specific region defined by the OS desktop data streams 400 may include the center portions of the desktopoperating system (OS) screen. In this example, the GPU 408 may be configured to first detect cell modifications at the center portions of the desktop operating system (OS) screen before detecting the rest of the regions (e.g., border of the desktop operating system (OS) screen).

Example Graphical Display

Figure 5:
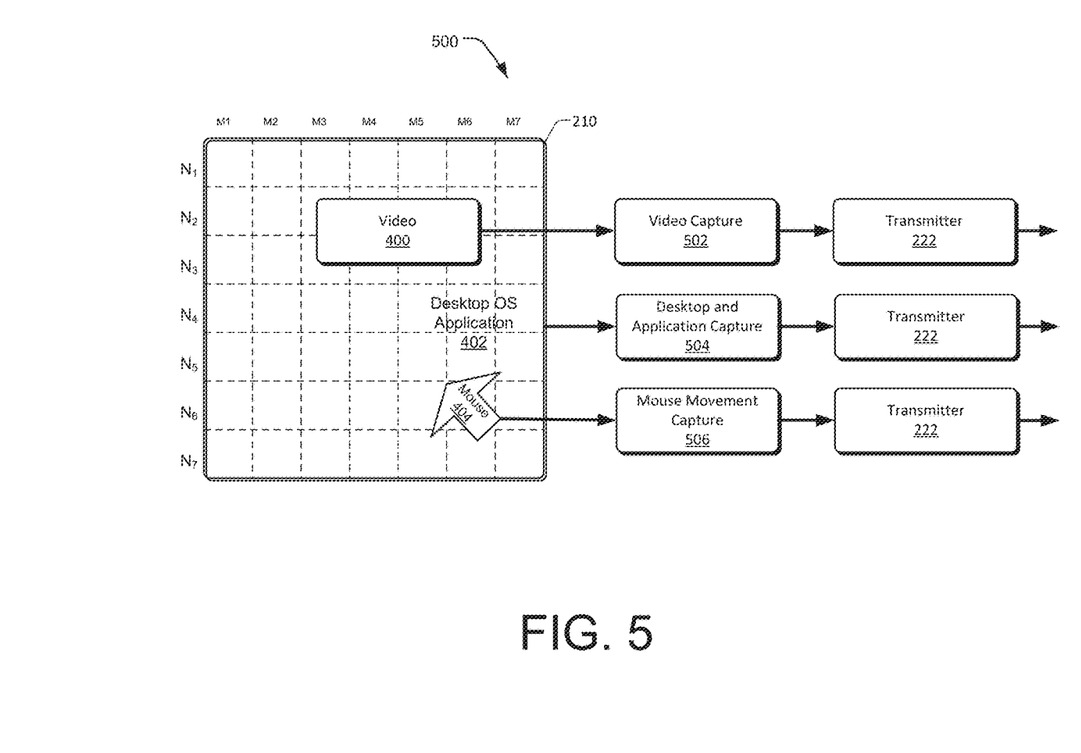
FIG. 5 is a diagram illustrating a graphical display that includes different layers for enhanced wireless display (WiDi).

FIG. 5 is an example graphical display 500 illustrating different layers that may be displayed at display device 104. In an implementation, the display data 210 may be decomposed into three layers such as, video 400, desktop operating system (OS) application 402, and mouse (pointing device) 404. As discussed above, the user may select one or more combination of layers to display at the display device 104. For example, the video 400 may be selected for video streaming at the display device 104. In this example, the video 400 is video captured (by video capture 502), encoded (by WiDi multi-streams encoder 214), and transmitted independently by the transmitter 222 to the display device 104. In an implementation, the encoding of the video 400 may use H264 standard hardware based encoding (e.g., H264 video format) that covers all forms of digitally compressed video such as HDTV broadcast applications. In this implementation, the video 400 may use the RTP as the transport protocol when video streamed through the transmitter 222. The required transcoding and QOS for the video 400 may be modified, encoded, and presented indirectly of the desktop operating system (OS) application 402 display, which is streamed independently of the video 400.

The desktop operating system (OS) application 402 may contain the operating system (OS) desktop data streams, which are encoded by first dividing the graphical display into a grid structure that includes N×M pixels (e.g., $N_7 \times M_7$ pixels). The N×M pixels may be dynamically adjusted based upon the display content. To reduce wireless contention on small frames and maximize on compression, the values for the N and M may be chosen to be dynamically adjusted for optimal performance given network conditions. In an implementation, the desktopoperating system (OS) application 402 is captured (by desktop and application capture 504) and transported on demand through the transmitter 222 to the display device 104. In other words, specified cells of the screen that are modified may be transmitted given definable QOS and frame update rates—that may be specified independent of the video 400.

In an implementation, the mouse (pointing device) 404 may include the user's mouse (pointing device) movements that are transmitted (by the transmitter 222) as Cartesian coordinates. In this implementation, the movements may be captured by mouse movement capture 506. To reduce network overhead and increase performance (given problems with small frame sizes and increased wireless contention), data frames containing mouse (pointing device) coordinate points may be transmitted given desired resolution and desired user experience or QOS. Interpolation between points may be used to reduce overhead of improve reliability given frame loss if UDP is used rather than the TCP. The mouse movement capture 506, the desktop and application capture 504, and the video capture 502 may all be implemented by the updating unit 212.

Example Process

Figure 6:
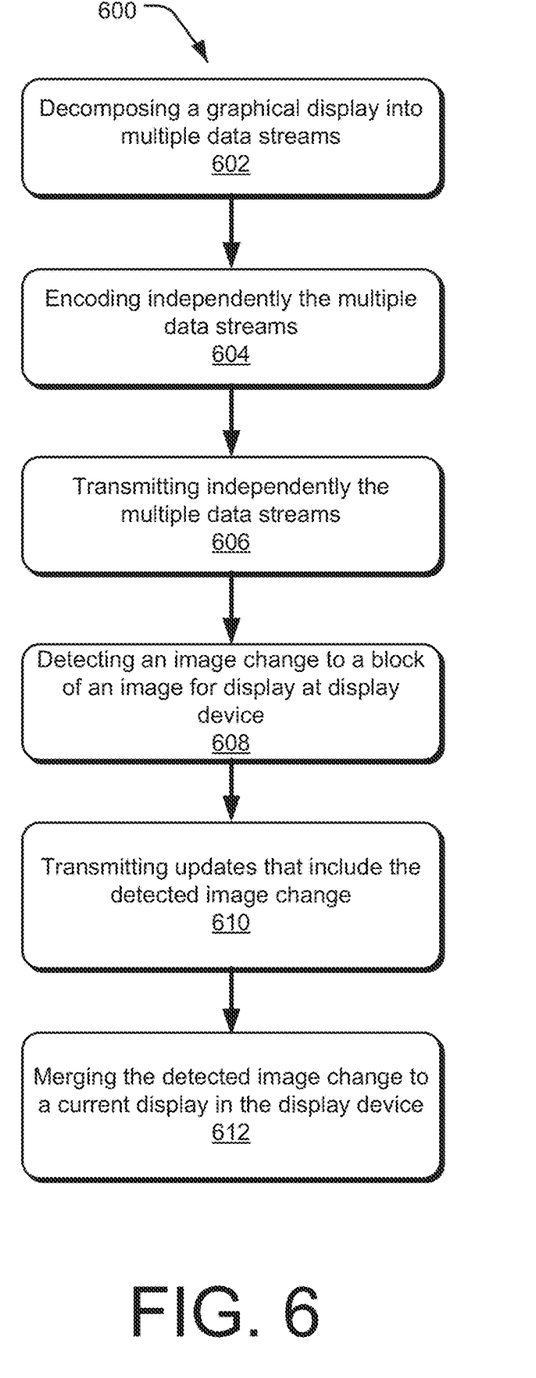
FIG. 6 is a flow chart illustrating an example method for enhanced wireless display (WiDi) using parallelized graphics processing unit (GPU) based algorithm.

FIG. 6 shows an example process 600 for enhanced WiDi that includes independent multiple data streaming to a display device. The order in Which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, decomposing a graphical display is performed. In an implementation, the graphical display in display data (e.g., display data 210) is decomposed to include multiple data streams (i.e., different layers). The multiple data streams may include multimedia data streams, operating system (OS) desktop data streams, and mouse (pointing device) data streams.

At block 604, encoding independently each of the multiple data streams for transmission. In an implementation, a WiDi multi-streams encoder (e.g., WiDi multi-streams encoder 214) may encode independently the multiple data streams. For example, the multimedia data streams are separately encoded from the operating system (OS) desktop and mouse (pointing device) data streams.

At block 606, transmitting the encoded multiple data streams is performed. In an implementation, the multiple data streams are transmitted through a communication layer(s) (e.g., communication layer(s) 216). For example, the multimedia data streams are transmitted using H264 standard hardware and RTP protocol. On the other hand, the operating system (OS) desktop and mouse (pointing device) data streams are transmitted on demand or using the UDP/TCP protocols.

At block 608, detecting an image change to a block of an image is performed. In an implementation, the image includes a frame that is divided into k number of cells (i.e., blocks). The k number of cells may include a total of N×M pixels. The k number of blocks between two successive frames may be compared using a parallelized GPU based algorithm contained in an updating unit component (e.g., updating unit 212) to determine the exact location of the cell(s) that defines the image change. The detected cells may include updates for next transmission at the device source (e.g., device source 102). In another implementation, the N×M pixels may be dynamically adjusted according to network conditions.

At block 610, transmitting the updates that include the detected image change is performed. In an implementation, the N×M pixels is dynamically adjusted to ensure that the image change (i.e., modified cell) is fitted into a single data frame to enable more atomic updates and limiting the effect of corrupted or lost frame. To this end, the UDP in addition to TCP may be implemented during transmission as a single frame loss would not drastically affect the overall screen update. In other implementations, the atomic updates may be implemented by assigning importance to updates of specific regions (e.g., of the Desktop operating system (OS) screen) given the way in which a user may view the screen. For example, the user tends to notice the central region of the screen more frequently than the periphery or outer regions of the desktop operating system (OS) screen (e.g., clock at bottom of desktop operating system (OS) screen). To this end, the central region that includes the most visible points can be transmitted with greater priori when cell modification is detected by the updating unit 212.

At block 612, merging the detected image change to current display in the display device is performed. In an implementation, the detected updates are received by a multi-streams decoder component (e.g., multi-streams decoder 322). The detected updates may be merged by integrating the updates to current buffer frame stored at the updating unit/frame buffer component 322. The merged updates may be displayed at the display data 324 of the device source 104.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method performed by a device source comprising:
decomposing a graphical display at the device source into multiple data streams that include multimedia data stream, an operating system desktop data stream, and a pointing device data stream;
encoding separately and independently the multiple data streams for transmission;
transmitting the encoded multiple data streams;
detecting an image change to a block of an image, wherein the image change is detected by comparing two successive frames using a parallelized graphical processing unit based algorithm;
determining an assigned update—importance of the detected image change, wherein the assigned update—importance is different for a particular region of a desktop operating system (OS) screen; and
transmitting updates, wherein a transmission-priority of the transmitting updates is based on the determined assigned update—importance.

2. The method of claim 1, wherein the decomposing of the multiple data streams is processed independently of operating system desktop manager at the device source.

3. The method of claim 1, wherein the multiple data streams include different level of quality of service.

4. The method of claim 1, wherein the transmitting adopts real time protocol for the multimedia data stream, and transmission control protocol or user datagram protocol for the operating system desktop and mouse data streams.

5. The method of claim 1, wherein the detecting includes the parallelized graphical processing unit based algorithm that compares individual cells of the two successive frames.

6. The method of claim 1, further comprising dividing a frame into blocks that include dynamic number of pixels, wherein the dynamic number of pixels is adjusted to fit a single frame to limit effect of corrupted or lost frame.

7. The method of claim 1, wherein the detecting is stopped once a cell modification is detected by the parallelized graphical processing unit based algorithm.

8. A device source comprising:
one or more processors;
memory configured to the one or more processors that comprises:

an updating unit that decomposes a graphical display into multiple data streams that include multimedia data stream, an operating system desktop data stream, and a mouse data stream, wherein the updating unit detects an image change to a block of an image by comparing two successive frames using a parallelized graphical processing unit based algorithm, wherein the detected image change includes an assigned update—importance, wherein the assigned update—importance is different for a particular region of a desktop operating system (OS) screen;

a multi-streams encoder that encodes independently the multiple data streams; and a communication layer that implements different communication protocols to transmit the encoded multiple data streams that include the detected image change, wherein a transmission—priority of the detected image change is based on the detected assigned update—importance.

9. The device source of claim 8, wherein the updating unit processes the decomposition of the multiple data streams independently of operating system desktop manager at the device source.

10. The device source of claim 8, wherein the multiple data streams include different level of quality of service.

11. The device source of claim 8, wherein the updating unit detects the image change by comparing individual cells of the two successive frames.

12. The device source of claim 8, wherein the updating unit stops detecting once a cell modification is detected by the parallelized graphical processing unit based algorithm.

13. The device source of claim 8, wherein the updating unit divides a frame into blocks that include dynamic number of pixels, wherein the dynamic number of pixels is adjusted to fit a single frame to limit effect of corrupted or lost frame.

14. The device source of claim 8, wherein the communication layer adopts real time protocol for the multimedia data stream, and transmission control protocol or user datagram protocol for the operating system desktop and mouse data streams.

15. A display device comprising:
one or more processors; and
memory configured to the one or more processors that comprises:
an updating unit and frame buffer that receives multiple data streams, which include a multimedia data stream, an operating system desktop data stream, and a mouse data stream, wherein the updating unit/frame buffer merges detected updates to a current frame buffer, the detected updates includes an image change to a block of an image derived by a device source by comparing two successive frames using a parallelized graphical processing unit based algorithm, wherein the detected updates includes an assigned update—importance of the detected image change, the assigned update—importance is different for a particular region of a desktop operating system (OS) screen.

16. The display device of claim 15, wherein the updating unit/frame buffer receives the multiple data streams that were processed independently of operating system desktop manager at the device source.

17. The display device of claim 15, wherein the multiple data streams include different level of quality of service.

18. The display device of claim 15, wherein the updating unit and frame buffer is configured to receive a dynamic number of pixels that are adjusted to fit a single frame to limit effect of corrupted or lost frames.

19. The display device of claim 15, wherein the display data displays the merge updates configured to give priority to specified regions of operating system desktop.

20. The display device of claim 15 further comprising a multi-streams decoder to decode the multiple data streams that were encoded and transmitted independently at the device source.

21. The display device of claim 15 further comprising a communication layer that adopts real time protocol for the multimedia data stream, and transmission control protocol or user datagram protocol for the operating system desktop and mouse data streams.

22. At least one non-transitory computer accessible medium that performs a method comprising:
decomposing a graphical display at into multiple data streams that includes one or more of the following: multimedia data stream, an operating system desktop data stream, and a pointing device data stream;
encoding separately and independently the multiple data streams;
transmitting the encoded multiple data streams;
detecting an image change to a block of an image for display, wherein the image change is detected by comparing two successive frames;
determining an assigned update—importance of the detected image change, wherein the assigned update—importance is different for a particular region of a desktop operating system (OS) screen;
transmitting updates, wherein a transmission—priority of the transmitting updates is based on the determined assigned update—importance; and
merging the detected image change to a current display in the display device.

23. The non-transitory computer accessible medium of claim 22, wherein the decomposing of the multiple data streams, which include different level of quality of service, is processed independently of operating system desktop manager at the device source.

24. The non-transitory computer accessible medium of claim 22, wherein the transmitting the encoded multiple data streams adopts real time protocol for the multimedia data stream, and transmission control protocol or user datagram protocol for the operating system desktop and mouse data streams.

25. The non-transitory computer accessible medium of claim 22, wherein the detecting includes a parallelized graphical processing unit based algorithm that compares individual cells of the two successive frames.

26. The non-transitory computer accessible medium of claim 22, further comprising dividing a frame into blocks that include a dynamic number of pixels, wherein the dynamic number of pixels is adjusted to fit a single frame to limit effect of corrupted or lost frame.

* * * * *